(12) United States Patent
Hashimoto et al.

(10) Patent No.: US 9,321,937 B2
(45) Date of Patent: *Apr. 26, 2016

(54) POLYCHLOROPRENE LATEX, RUBBER-ASPHALT COMPOSITION AND UTILIZATION METHOD THEREOF, SHEET, AND WATERPROOF COATING FILM

(75) Inventors: Ikuka Hashimoto, Niigata (JP); Kenji Mochizuki, Niigata (JP); Takeo Mori, Niigata (JP)

(73) Assignee: Denka Company Limited, Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 13/813,313

(22) PCT Filed: Mar. 25, 2011

(86) PCT No.: PCT/JP2011/057349
§ 371 (c)(1),
(2), (4) Date: Jan. 30, 2013

(87) PCT Pub. No.: WO2012/017705
PCT Pub. Date: Feb. 9, 2012

(65) Prior Publication Data
US 2013/0131228 A1    May 23, 2013

(30) Foreign Application Priority Data

Aug. 6, 2010  (JP) ................. 2010-177880

(51) Int. Cl.
| | |
|---|---|
| *C08L 95/00* | (2006.01) |
| *C04B 24/26* | (2006.01) |
| *C08F 14/14* | (2006.01) |
| *C08F 14/16* | (2006.01) |
| *C08F 34/00* | (2006.01) |
| *C08F 114/14* | (2006.01) |
| *C08F 114/16* | (2006.01) |
| *C08F 134/00* | (2006.01) |
| *C08F 214/14* | (2006.01) |
| *C08F 214/16* | (2006.01) |
| *C08F 234/00* | (2006.01) |
| *C09D 195/00* | (2006.01) |
| *C08F 36/18* | (2006.01) |
| *C08L 11/02* | (2006.01) |
| *C08F 2/26* | (2006.01) |

(52) U.S. Cl.
CPC .............. *C09D 195/005* (2013.01); *C08F 2/26* (2013.01); *C08F 36/18* (2013.01); *C08L 11/02* (2013.01); *C08L 95/005* (2013.01); *C08L 2555/80* (2013.01)

(58) Field of Classification Search
CPC .............. C08F 36/18; C08F 2/24; C08F 2/26; C08L 11/02; C08L 11/95; C08L 11/005; C08L 2555/80; C09D 195/005
USPC .................. 524/383, 458, 160, 60; 427/385.5
See application file for complete search history.

(56) References Cited

U.S. PATENT DOCUMENTS

| | | | |
|---|---|---|---|
| 2007/0043165 A1 | 2/2007 | Watanabe et al. | |
| 2008/0076855 A1* | 3/2008 | Reif et al. ........................ | 524/71 |
| 2010/0010136 A1 | 1/2010 | Takenoshita et al. | |
| 2014/0011936 A1* | 1/2014 | Hashimoto et al. ........... | 524/432 |

FOREIGN PATENT DOCUMENTS

| | | | |
|---|---|---|---|
| CN | 1788028 | | 6/2006 |
| CN | 101235252 | | 4/2011 |
| JP | 1973055979 | | 8/1973 |
| JP | 2000-219859 | A | 8/2000 |
| JP | 2001-019923 | A | 1/2001 |
| JP | 2001/31935 | * | 2/2001 |
| JP | 2001-031935 | A | 2/2001 |
| JP | 2001-049043 | A | 2/2001 |
| JP | 2002-264250 | A | 9/2002 |
| JP | 2004-091728 | A | 3/2004 |
| JP | 2004-293070 | A | 10/2004 |
| JP | 2009-102465 | A | 5/2009 |
| JP | 2010-100749 | | 5/2010 |
| WO | 2008/026671 | A1 | 3/2008 |

OTHER PUBLICATIONS

Machine trasnlation, JP 2001-31935.*
International Search Report of PCT/JP2011/057349 dated Jul. 5, 2011.

* cited by examiner

*Primary Examiner* — Susannah Chung
*Assistant Examiner* — Robert T Butcher
(74) *Attorney, Agent, or Firm* — Roberts Mlotkowski Safran & Cole, PC

(57) ABSTRACT

Provided are a polychloroprene latex giving a rubber-asphalt composition superior in low-temperature stability and film-forming property on the material to be coated, a rubber-asphalt composition and a utilization method thereof, a sheet, and a waterproof coating film. The rubber-asphalt composition includes a major agent containing 10 to 40 mass % of the anionic polychloroprene latex comprising potassium ions in an amount of 0.7 to 1.5 parts by mass and sodium ions in an amount of controlled to be 0.2 part by mass or less with respect to 100 parts by mass of the solid matter and 60 to 90 mass % of an anionic asphalt emulsion; and a coagulating agent of an aqueous solution containing a polyvalent metal salt as the principal component.

17 Claims, No Drawings

POLYCHLOROPRENE LATEX, RUBBER-ASPHALT COMPOSITION AND UTILIZATION METHOD THEREOF, SHEET, AND WATERPROOF COATING FILM

TECHNICAL FIELD

The present invention relates to a polychloroprene latex, a rubber-asphalt composition containing the polychloroprene latex, a utilization method thereof, and a sheet and a waterproof coating film obtained by drying the rubber-asphalt composition. More specifically, it relates to a method of improving the low-temperature properties of a rubber-asphalt composition.

BACKGROUND ART

A method of using a rubber-asphalt composition has been known as a waterproofing method used in the fields of construction and civil work. The rubber-asphalt composition, which comprises a major agent of a mixture of an asphalt emulsion and a rubber latex and a coagulating agent blended thereto, gives a waterproof coating film, as it is coated and dried on a material to be coated.

One of the waterproofing technologies employing such a rubber-asphalt composition is, for example, a multilayered waterproof sheet comprising a weather-resistant film layer of a resin composition containing a fluorine resin, a thermoplastic resin film layer, and a rubber asphalt layer that are laminated sequentially (see Patent Document 1). Also proposed was a waterproofing method of forming a waterproof coating film by using a composition comprising an asphalt emulsion containing an ionically modified polymer and a curing agent of an aqueous polymer carrying ions charges opposite to those of the ionically modified polymer (see Patent Document 2).

Also proposed was an integrated waterproofing method of combining a modified asphalt composition comprising a rubber asphalt emulsion obtained by adding and mixing a heat-fused asphalt with a surfactant-containing polymer latex and a polyisocyanate compound blended thereto and a waterproof sheet (see Patent Document 3).

CITATION LIST

Patent Documents

[Patent Document 1] Japanese Unexamined Patent Application Publication No. 2002-264250
[Patent Document 2] Japanese Unexamined Patent Application Publication No. 2004-091728
[Patent Document 3] Japanese Unexamined Patent Application Publication No. 2004-293070

SUMMARY OF INVENTION

Technical Problem

However, the conventional technologies described above have the following problems. Multilayered waterproof sheets having a rubber asphalt layer and another resin layer, such as the waterproof sheet described in Patent Document 1, are not readily converted into complicated shape, leading to increase of the labor for installation for example on irregular-surfaced regions and thus to elongation of the construction period and increase of construction cost.

In addition, the rubber-asphalt composition described in Patent Document 2 may have varying rubber content, depending on the metering accuracy of the major agent on the construction site, leading to fluctuation in physical properties after application. Further, the rubber-asphalt composition described in Patent Document 3, which contains a heat-fused asphalt as it is added to and mixed in a polymer latex, has a problem that it demands a sophisticated production facility and technology.

On the other hand, when a polychloroprene latex is used as the rubber component, the rubber-asphalt composition, if it contains a low-temperature stabilizer added for improvement in stability at low temperature, has a problem that the film-forming property thereof during conversion into a sheet or a waterproof coating film on the material to be coated declines.

Accordingly, the main object of the present invention is to provide a polychloroprene latex giving a rubber-asphalt composition superior both in low-temperature stability and film-forming property on the material to be coated, a rubber-asphalt composition, a utilization method thereof, a sheet, and a waterproof coating film.

Solution to Problem

The polychloroprene latex according to the present invention is an anionic polychloroprene latex containing potassium ions in an amount of 0.7 to 1.5 parts by mass and sodium ions in an amount controlled to be 0.2 part by mass or less with respect to 100 parts by mass of the solid matter.

The amounts of the potassium and sodium ions specified above are values determined by acid-decomposing the polychloroprene latex with sulfuric/nitric acid and measuring the ions by using an inductively coupled plasma-atomic emission spectrometer (ICP-AES).

The polychloroprene latex may have a gel content of 70 to 95 mass %.

The polychloroprene latex may be a latex prepared by starting the emulsion polymerization, as an initial addition amount of the monomer is adjusted to be 10 to 50 mass % of all monomers added, and adding the remaining monomers previously cooled to a temperature lower than the polymerization temperature to the polymerization system continuously during the period of from the time when the polymerization proceeds to a monomer conversion rate of 1 to 40% until the time when the polymerization reaches the final conversion rate.

The rubber-asphalt composition according to the present invention includes a major agent containing 10 to 40 mass % of the polychloroprene latex described above and 60 to 90 mass % of an anionic asphalt emulsion and additionally a coagulating agent of an aqueous solution containing a polyvalent metal salt as the principal component.

A method of utilizing the rubber-asphalt composition according to the present invention provides a waterproof coating film, as a major agent containing 10 to 40 mass % of the polychloroprene latex and 60 to 90 mass % of an anionic asphalt emulsion and a coagulating agent of an aqueous solution containing a polyvalent metal salt as the principal component are sprayed onto a material to be coated separately through different ejecting ports and coagulated and dried on the surface of the material to be coated.

A sheet according to the present invention is a sheet obtained by drying the rubber-asphalt composition described above.

A waterproof coating film according to the present invention is a film obtained by applying and drying the rubber-asphalt composition described above on a material to be coated.

Advantageous Effects of Invention

Because the amounts of sodium and potassium ions in the latex are controlled in particular ranges, it is possible according to the present invention to provide a rubber-asphalt composition superior both in low-temperature stability and film-forming property on the material to be coated.

DESCRIPTION OF EMBODIMENTS

Hereinafter, favorable embodiments of the present invention will be described in detail. However, it should be understood that the present invention is not restricted by the embodiments described below.

First Embodiment

First, a first embodiment of the polychloroprene latex according to the present invention will be described. The polychloroprene latex in the present embodiment is an anionic latex (emulsion) prepared by emulsifying a homopolymer of 2-chloro-1,3-butadiene (hereinafter, referred to as chloroprene) or a copolymer of chloroprene with other monomers. The polychloroprene latex in the present embodiment is controlled to contain potassium ions in an amount of 0.7 to 1.5 parts by mass and sodium ions in an amount of 0.2 part by mass or less with respect to 100 parts by mass of the solid matter.

Potassium Ion: 0.7 to 1.5 Parts by Mass

When the content of potassium ions in the polychloroprene latex is less than 0.7 part by mass with respect to 100 parts by mass of the solid matter, the low-temperature stability declines. For improvement of the low-temperature stability of the polychloroprene latex, it is needed to add a low-temperature stabilizer. In such a case, it leads to deterioration of the film-forming property of the rubber-asphalt composition. The "low-temperature stability" of the polychloroprene latex, as used herein, means that the latex remains flowable without thickening or coagulation even in an environment at 0° C. or lower.

On the other hand, when the potassium ion content is more than 1.5 parts by mass with respect to 100 parts by mass of the solid matter, the amounts of electrolytes in the polychloroprene latex and in the rubber-asphalt composition containing the same increase excessively, leading to deterioration in stability and also to generation of aggregates. When the stability declines significantly, the polychloroprene latex may solidify. The potassium ion content in the polychloroprene latex is preferably 1.0 to 1.3 parts by mass with respect to 100 parts by mass of the solid matter and it is thus possible to improve the low-temperature stability of the polychloroprene latex without addition of a low-temperature stabilizer.

Sodium Ion: 0-0.2 Part by Mass

The sodium ion content in the polychloroprene latex is preferably as low as possible and most preferably zero. However, the polychloroprene latex may contain the sodium ions derived from emulsifying agents. Thus in the chloroprene latex of the present embodiment, the sodium ion content is controlled to be 0.2 part by mass or less with respect to 100 parts by mass of the solid matter.

When the sodium ion content in the polychloroprene latex is more than 0.2 part by mass with respect to 100 parts by mass of the solid matter, the low-temperature stability declines. As described above, it is needed to add a low-temperature stabilizer in order to use a latex with lower low-temperature stability in a rubber-asphalt composition, which also leads to deterioration in film-forming property during preparation of a sheet or a waterproof coating film.

The sodium ion content in the chloroprene latex is desirably 0.1 part by mass or less with respect to 100 parts by mass of the solid matter. It is thus possible to improve the low-temperature stability of the polychloroprene latex further without addition of a low-temperature stabilizer.

Method of Controlling Ion Contents

The contents of potassium and sodium ions described above can be adjusted, for example, by modifying the kinds and the addition amounts of the reducing agents and the buffer salts used for acceleration of emulsion polymerization of chloroprene. Potassium salts such as potassium pyrosulfite, potassium sulfite, potassium hydrogen sulfite, potassium phosphate, and potassium hydrogen phosphate can be used as the reducing agents and the buffer salts.

The potassium and sodium ion contents can be determined by acid-decomposing the polychloroprene latex with sulfuric/nitric acid and measuring the ions by using an inductively coupled plasma-atomic emission spectrometer (ICP-AES).

Gel Content

The polychloroprene latex of the present embodiment desirably has a gel content of 70 to 95 mass %. The "gel content," as used herein, is a proportion of toluene solvent-insoluble components contained in the chloroprene latex and can be calculated according to the following Formula (1):

[Formula 1]

$$\text{Gel content (\%)} = (b/a) \times 100 \tag{1}$$

In Formula (1) above, "a" is the mass of the polychloroprene latex after freeze drying (solid content). Also in Formula (1) above, "b" is the mass of the gel (toluene-insoluble components) contained in the chloroprene latex, which is a value determined by the method described below.

First, the entire amount of the latex after freeze drying is dissolved in toluene at 23° C. over 20 hours. The solid matter concentration is then adjusted to be 0.6 mass %. The toluene solution containing the latex is then subjected to solid-liquid separation by centrifugal separator, and the insoluble matter, or gel, is separated by using a 200-mesh wire screen. Thereafter, the isolated gel is dried in air and then under an atmosphere at 110° C. for 1 hour and the mass b (gel amount) is determined.

When a polychloroprene latex having a gel content of 70 to 95 mass % is used in the rubber-asphalt composition, it gives a sheet or a waterproof coating film without liquid dripping even if it is applied under high temperature condition. The gel content in the chloroprene latex can be adjusted, as the addition amount of the chain-transfer agent or the conversion rate of the monomer is altered.

Solid Matter Concentration

The polychloroprene latex of the present embodiment desirably has a solid matter concentration of 40 to 60 mass %.

It is thus possible, when used in the rubber-asphalt composition, to shorten the period needed for drying and to improve processability in production of a sheet or a waterproof coating film.

Production Method

The polychloroprene latex of the present embodiment can be obtained by polymerization of chloroprene alone or chloroprene and other monomer in combination. The polymerization methods include emulsion polymerization, solution polymerization, suspension polymerization, bulky polymerization, and others, and emulsion polymerization method is particularly preferable.

The emulsion polymerization is desirably carried out by starting the emulsion polymerization, as the initial addition amount of the monomer is adjusted to be 10 to 50 mass % of all monomers added, and adding continuously the remaining monomers previously cooled to a temperature lower than the polymerization temperature to the polymerization system continuously during the period of from the time when the polymerization proceeds to a monomer conversion rate of 1 to 40% until the time when the polymerization reaches the final conversion rate. It is thus possible to raise the heat-dissipating efficiency of the polymerization system and thus to produce the polychloroprene latex efficiently.

The emulsifying-dispersing agent for use during emulsion polymerization may be, for example, a commonly-used alkali-metal salt of rosin acid, but potassium salt of disproportionated rosin acid is preferably used for adjustment of the sodium and potassium ion contents in the latex.

It is also possible to use an alkali-metal salt of rosin acid described above and a carboxylic acid-, sulfonic acid-, sulfate ester- or phosphoric acid ester-type emulsifying-dispersing agent in combination. Examples of the emulsifying-dispersing agents that can be used include carboxylic acid-type agents such as fatty monocarboxylic acid salts, polyoxyethylene alkyl ethercarboxylic acid salts, n-acylsarcosine salts, n-acylglutamate salts and the like.

The sulfonic acid-type agents include dialkylsulfosuccinic acid salts, alkanesulfonic acid salts, α-olefinsulfonic acid salts, straight-chain alkylbenzenesulfonic acid salts, alkyl (branched)benzenesulfonic acid salts, naphthalenesulfonic acid salt-formaldehyde condensates, alkylnaphthalenesulfonic acid salts, n-methyl-n-acyltaurine salts and the like.

The sulfate ester-type agents include alkylsulfate ester salts, alcohol ethoxysulfates, oil-derived sulfate ester salts and the like. Alternatively, the phosphate ester-type agents include alkylphosphoric acid salts, polyoxyethylene alkyl etherphosphoric acid salts, polyoxyethylene alkylphenyl etherphosphoric acid salts and the like.

Other emulsifying-dispersing agents that can be used in combination with the rosin acid alkali-metal salt include, for example, alkylallylsulfonic acids, polyoxyethylene phenyl ethers, polyoxyalkylene alkyl ethers, polyoxyethylene alkylene alkyl ethers, polyoxyethylene styrenated phenyl ethers, polyoxyethylene distyrenated phenyl ethers, polyoxyethylene tribenzylphenyl ethers, polyoxyethylene polyoxypropylene glycols, polyoxyalkylene alkenyl ethers, sorbitan fatty acid esters, polyoxyethylene sorbitan fatty acid esters and the like.

In the polychloroprene latex of the present embodiment, an anionic emulsifying-dispersing agent is preferably used and, in particular among them, a potassium salt is desirably used for reduction of sodium ion content. However, the emulsifying-dispersing agents other than the rosin acid alkali-metal salts described above have little influence on the sodium ion content in the polychloroprene latex, as their contents are limited. For that reason, the sodium salts thereof, which are more commonly used, may be used.

The chain-transfer agent used during the emulsion polymerization is not particularly limited and those commonly used in emulsion polymerization of chloroprene can be used. Specifically, it is possible to use known chain-transfer agents including long-chain alkylmercaptans such as n-dodecylmercaptan and tert-dodecylmercaptan, dialkyl xanthogen disulfides such as diisopropyl xanthogen disulfide and diethyl xanthogen disulfide, and iodoform.

In addition, organic peroxides such as potassium persulfate, ammonium persulfate, sodium persulfate, hydrogen peroxide, and benzoyl peroxide can be used as the polymerization initiators.

The polymerization condition is also not particularly limited, but the polymerization temperature is desirably 0 to 55° C. and the monomer conversion rate 50 to 100%. If the polymerization is terminated before the monomer conversion rate reaches 100%, for example, thiodiphenylamine, 4-tert-butylcatechol, 2,2-methylene-bis-4-methyl-6-tert-butylphenol, or diethylhydroxylamine can be used as the polymerization inhibitor.

Further, the polychloroprene latex of the present embodiment may be blended, after polymerization, with pH adjusters, freezing stabilizers, metal oxides such as zinc oxide, inorganic fillers such as calcium carbonate and silica, plasticizer-softeners such as dibutyl phthalate and process oils, various aging inhibitors and vulcanization accelerators, curing agents such as isocyanates, thickeners and others arbitrarily in the range that does not impair the advantageous effects of the present invention.

As described above in detail, the polychloroprene latex of the present embodiment, which contains potassium and sodium ions each in particular ranges, gives a rubber-asphalt composition with improved low-temperature stability without deterioration in film-forming property.

Second Embodiment

Hereinafter, the rubber-asphalt composition in a second embodiment of the present invention will be described. The rubber-asphalt composition of the present embodiment employs the polychloroprene latex of the first embodiment described above and comprises a "major agent" and a "coagulating agent."

Major Agent

The major agent in the rubber-asphalt composition of the present embodiment contains the polychloroprene latex of the first embodiment in an amount of 10 to 40 mass % and an anionic asphalt emulsion in an amount of 60 to 90 mass %. The "anionic asphalt emulsion" is an emulsion of asphalt dispersed in water with an anionic dispersing agent.

The asphalt blended to the major agent of the asphalt composition of the present embodiment is a natural asphalt or a petroleum asphalt. Examples of the natural asphalts include Gilsonite, Grahamite, and Trinidad asphalts and the like, and examples of the petroleum asphalts include straight asphalts with various penetrations obtained by distillation of crude oil, blown and semi-blown asphalts obtained by oxidative polymerization of the straight asphalts by introduction of air therein, and the like. These asphalts may be used alone or as a mixture of two or more.

Examples of the anionic dispersing agents used for dispersion of the asphalt include fatty acids, higher alcohol sulfate esters, alkylbenzenesulfonic acids, carboxylic acids, sulfonic acids and the alkali-metal salts thereof. They may be used alone or as a mixture of two or more. It is possible by using these anionic dispersing agents to improve dispersibility of asphalt particles in the asphalt emulsion. The anionic asphalt emulsion is favorable as an emulsion for waterproof materials, because it is readily decomposed by the polyvalent metal ions and other chemicals described below.

The amount of the anionic dispersing agent used is desirably 0.2 to 0.5 part by mass with respect to 100 parts by mass of the solid matter in the asphalt emulsion. It is thus possible to disperse asphalt particles in water substantially and sufficiently. Alternatively, the solid matter concentration of the anionic asphalt emulsion is preferably adjusted to be 40 to 60 mass %. It is thus possible, in preparation of sheets and waterproof coating films by using the rubber-asphalt composition obtained, to shorten the drying period and improve the processability.

When the amount of the anionic asphalt emulsion is less than 60 mass % in the major agent, i.e., when the polychloroprene latex content is more than 40 mass %, the raw material cost will increase, because the rate of cheaper asphalt emulsion decreases. Alternatively when the amount of the anionic asphalt emulsion is more than 90 mass % in the major agent, i.e., when the polychloroprene latex content is less than 10 mass %, the content of the chloroprene rubber in the sheet or waterproof coating film obtained decreases excessively, leading to deterioration in tensile strength and generation of crackings at low temperature.

Accordingly, the content of the polychloroprene latex in the major agent of the rubber-asphalt composition of the present embodiment is 10 to 40 mass % and the content of the anionic asphalt emulsion is 60 to 90 mass %. The configuration of the polychloroprene latex blended to the major agent is identical with that described above in the first embodiment.

The major agent may contain macromolecular polymers such as polyethylene and ethylene-vinyl acetate copolymers, tackifiers such as petroleum resins, process oils, plasticizers, curing accelerators, aging inhibitors, dispersion stabilizers, low temperature stabilizers, viscosity regulators and the like. The major agent may further contain various fillers, including organic synthetic fibers, natural fibers, wood powders, pulps, and inorganic fillers such as glass fiber, talc, calcium carbonate, calcium sulfate, silica, and sand, and powder vulcanized rubbers, as they are blended.

The major agent may contain, additionally as needed, an antifoam, in particular a silicone-, alcohol-, fatty acid-, or fatty acid ester-based emulsion-type antifoam in an amount of 1 mass %.

Coagulating Agent

The coagulating agent in the rubber-asphalt composition of the present embodiment is an aqueous solution containing a polyvalent metal salt as the principal component. The polyvalent metal salt, the principal component of the coagulating agent, should be readily soluble in water and superior in coagulating property of the rubber-asphalt composition and, for example, calcium chloride, calcium nitrate, or alum may be used. The components contained in the coagulating agent other than the polyvalent metal salt include, for example, ammonium sulfate, ammonium acetate, ammonium carbonate and the like.

The concentration of the polyvalent metal salt contained in the coagulating agent (aqueous solution) is not particularly limited and may be altered arbitrarily according to the application condition and the application site of the rubber-asphalt composition obtained.

Blending Ratio of Major Agent to Coagulating Agent

The rubber-asphalt composition of the present embodiment solidifies, when the major agent and the coagulating agent described above are mixed. The blending ratio of the major agent to the coagulating agent is not particularly limited, but the ratio of major agent: coagulating agent is preferably 9:1 to 7:3. When the blending ratio is in the range above, it is possible to solidify the rubber-asphalt composition in a shorter period of time and prevent excessive deposition of the coagulating agent on the surface.

Utilization Method

Hereinafter, a method of using the rubber-asphalt composition in the configuration described above, i.e., a waterproofing method by using the rubber-asphalt composition of the present embodiment will be described. The rubber-asphalt composition of the present embodiment provides a sheet, as it is cast and dried on a release paper and then the release paper is peeled off. The sheet provides a building or a structure with waterproofness, as it is applied thereon or bonded thereto with fixing means such as an adhesive or bonding adhesive.

It is also possible to form a waterproof coating film on the surface of a material to be coated, by applying and drying the rubber-asphalt composition of the present embodiment, as in the latex state, on the surface of the material by using an ejecting device such as spray gun or atomizer. Then, it is possible, by using an ejecting device having two or more ejecting ports and ejecting the major agent and the coagulating agent separately from different ejecting ports, to avoid coagulation of the rubber-asphalt composition in the area close to the ejecting ports.

The thickness of the sheet or the waterproof coating film prepared from the rubber-asphalt composition of the present embodiment may be designed arbitrarily according to the application site and the use environment, but it is preferably in the range of 1 to 15 mm. Such a sheet or coating film is easier in handling and yet retains favorable waterproofness.

As described above in detail, because a chloroprene latex having potassium and sodium ion contents respectively controlled in particular ranges is used, the rubber-asphalt composition of the present embodiment is superior both in stability at low temperature and film-forming property on the material to be coated. Thus, the sheet and the waterproof coating film prepared from the rubber-asphalt composition of the present embodiment can be used favorably in waterproofing applications in the fields of construction and civil work, for example in waterproofing of walls, beds, ceilings and others.

EXAMPLES

Hereinafter, the advantageous effects of the present invention will be described specifically with reference to Examples and Comparative Examples of the present invention. The present invention is not restricted by these Examples. In the Examples, the polychloroprene latexes of Examples and Comparative Examples were prepared and the characteristics thereof evaluated by the methods shown below.

Example 1

Preparation of Polychloroprene Latex 100 parts by mass of water, 2.5 parts by mass of dispropotionated rosin acid potassium salt (RONDIS K-25, produced by Arakawa Chemical Industries, Ltd.), 0.75 part by mass of potassium hydroxide, 0.8 part by mass of naphthalenesulfonic acid formaldehyde condensate sodium salt (DEMOL N produced by Kao Corporation), and 0.5 part by mass of potassium pyrosulfite were placed and dissolved in a reactor having a capacity of 10 liter under nitrogen stream, and 100 parts by mass of chloroprene and 0.14 part by mass of n-dodecylmercaptan were added thereto under agitation.

Then, the mixture was polymerized at 45° C. under nitrogen atmosphere, as potassium persulfate was used as the initiator, and when the polymerization rate reached 90%, the polymerization was terminated by addition of a phenothiazine emulsion. Subsequently, unreacted monomers were removed under reduced pressure, to give a polychloroprene latex. The mixture was then concentrated, as water was evaporated under reduced pressure, for adjustment of the solid matter content in the polychloroprene latex to 60 mass %.

Then, the contents of potassium and sodium ions in the polychloroprene latex obtained were determined. Specifically, 1.0 g of the polychloroprene latex was acid-decomposed with sulfuric/nitric acid. After the solution was made acidic with hydrochloric acid, the amounts of alkali-metal salts were determined quantitatively on an inductively coupled plasma-atomic emission spectrometer (ICP-AES VISTA-PRO) manufactured by SII NanoTechnology Inc.

Preparation of Rubber-Asphalt Composition (Asphalt Emulsion)

An anionic asphalt emulsion having a solid matter concentration of 60 mass % at pH 11.0 (commercial product) was used.

(Major Agent)

25 parts by mass of the polychloroprene latex produced by the method described above and 75 parts by mass of an anionic asphalt emulsion were mixed at room temperature at a rotational velocity of 250 rpm in MAZELA Z (stirrer manufactured by Tokyo Rikakikai Co., Ltd.) for 30 minutes and the mixture was left still at room temperature for 30 minutes, to give a major agent.

(Coagulating Agent)

The coagulating agent used was an aqueous solution of calcium chloride (produced by Wako Pure Chemical Industries) dissolved in pure water at a concentration adjusted to 1 mass %.

Evaluation

Subsequently, (a) the low-temperature stability and (b) the coagulation tendency of the polychloroprene latex prepared by the method described above were evaluated and also, (c) the film-forming property of the rubber-asphalt composition was evaluated. Typical evaluation methods for respective items are described below.

(a) Low-temperature stability of polychloroprene latex

A polychloroprene latex was left under atmosphere at 5° C. for 1 week or under atmosphere at 0° C. for 1 day and the properties of the polychloroprene latex were evaluated by visual observation. The criteria for the evaluation were as follows:

○: there was no difference in the appearance of the polychloroprene latex;

Δ: there was increase in viscosity; and x: there was coagulation or generation of coagulum.

(b) Coagulation tendency of polychloroprene latex 1 g of a polychloroprene latex was added dropwise onto 50 g of 0.1 mass % aqueous calcium chloride solution; the precipitated rubber was dried at 110° C. for 3 hours; and the rubber coagulation rate of the polychloroprene latex was determined.

(c) Film-forming property of rubber-asphalt composition

A filter paper was immersed in 0.1 mass % aqueous calcium chloride solution (coagulating agent) and, after air drying for 1 minute, 1 g of the major agent of a rubber-asphalt composition containing 75 mass % of asphalt emulsion and 25 mass % of polychloroprene latex was applied uniformly on the surface. In addition, 0.1 g of 1 mass % aqueous calcium chloride solution (coagulating agent) was applied by spraying on the surface of the coated film of the major agent and the filming state on the surface was evaluated after 3 minutes. The criteria for the evaluation were as follows:

○: The surface filming efficiency by visual observation is 100%;

Δ: It is 80% or more; and x: It is less than 80%.

Examples 2 to 10 and Comparative Examples 1 and 4

Polychloroprene latexes and rubber-asphalt compositions were prepared similarly to Example 1, except that the blending rates were altered, and evaluated. The polychloroprene latex of Example 2 was prepared by starting polymerization by adding 30 parts by mass of chloroprene and 0.042 part by mass of n-dodecylmercaptan and continuing polymerization by additional addition of 70 parts by mass of chloroprene and 0.098 part by mass of n-dodecylmercaptan when the polymerization rate reached 10%.

The results are summarized in the following Tables 1 to 3. "RONDIS 3RN" shown in the following Tables 1 to 3 is a rosin acid sodium salt produced by Arakawa Chemical Industries, Inc. and "Emulgen 220" is polyoxyethylene cetyl ether produced by Kao Corporation.

TABLE 1

| | | | | | Example | | | | |
|---|---|---|---|---|---|---|---|---|---|
| | | | | | 1 | 2 | 3 | 4 | 5 |
| Polychloroprene latex | Composition (parts by mass) | Initial addition | Chloroprene | 100 | 30 | 100 | 100 | 100 |
| | | | n-Dodecylmercaptan | 0.14 | 0.042 | 0.14 | 0.14 | 0.20 |
| | | Divided addition | Chloroprene | — | 70 | — | — | — |
| | | | n-Dodecylmercaptan | — | 0.098 | — | — | — |
| | | Emulsifying agent | H$_2$O | 100 | 100 | 100 | 100 | 100 |
| | | | RONDIS 3RN | — | — | — | 0.50 | — |
| | | | RONDIS K-25 | 2.50 | 2.50 | 4.00 | 3.50 | 2.50 |
| | | | KOH | 0.75 | 0.75 | 0.50 | 0.50 | 0.75 |

TABLE 1-continued

|  |  |  |  | Example | | | | |
|---|---|---|---|---|---|---|---|---|
|  |  |  |  | 1 | 2 | 3 | 4 | 5 |
|  |  | Dispersing agent | DEMOL N | 0.80 | 0.80 | 0.80 | 0.30 | 0.80 |
|  |  | Reducing agent | Sodium hydrogen sulfite | — | — | — | — | — |
|  |  |  | Potassium pyrosulfite | 0.50 | 0.50 | 0.50 | 0.50 | 0.50 |
|  |  | Stabilizing agent | Emulgen 220 | — | — | — | — | — |
|  | Alkali-metal salt content (in solid matter, mass %) | | Na | 0.08 | 0.08 | 0.08 | 0.09 | 0.08 |
|  |  | | K | 1.10 | 1.10 | 1.09 | 1.03 | 1.10 |
|  | Gel content (mass %) | | | 89 | 88 | 85 | 87 | 62 |
| Evaluation results | Polychloroprene latex | Low-temperature stability | 5° C. | ◯ | ◯ | ◯ | ◯ | ◯ |
|  |  |  | 0° C. | ◯ | ◯ | ◯ | ◯ | ◯ |
|  |  | Coagulation tendency (%) | | 92 | 89 | 83 | 87 | 86 |
|  | Rubber-asphalt composition | Film-forming property | | ◯ | ◯ | ◯ | ◯ | ◯ |

TABLE 2

|  |  |  |  | Example | | | | |
|---|---|---|---|---|---|---|---|---|
|  |  |  |  | 6 | 7 | 8 | 9 | 10 |
| Polychloroprene latex | Composition (parts by mass) | Initial addition | Chloroprene | 100 | 100 | 100 | 100 | 100 |
|  |  |  | n-Dodecylmercaptan | 0.10 | 0.14 | 0.14 | 0.14 | 0.14 |
|  |  | Divided addition | Chloroprene | — | — | — | — | — |
|  |  |  | n-Dodecylmercaptan | — | — | — | — | — |
|  |  | Emulsifying agent | H$_2$O | 100 | 100 | 100 | 100 | 100 |
|  |  |  | RONDIS 3RN | — | — | — | — | — |
|  |  |  | RONDIS K-25 | 2.50 | 2.50 | 2.50 | 2.50 | 2.50 |
|  |  |  | KOH | 0.75 | 0.75 | 0.75 | 0.75 | 0.75 |
|  |  | Dispersing agent | DEMOL N | 0.80 | 0.80 | 0.80 | 0.80 | 0.80 |
|  |  | Reducing agent | Sodium hydrogen sulfite | — | — | — | 0.50 | 0.50 |
|  |  |  | Potassium pyrosulfite | 0.50 | 0.50 | 0.50 | — | — |
|  |  | Stabilizing agent | Emulgen 220 | — | — | — | 0.10 | 0.30 |
|  | Alkali-metal salt content (in solid matter, mass %) | | Na | 0.08 | 0.08 | 0.08 | 0.17 | 0.17 |
|  |  | | K | 1.10 | 1.10 | 1.10 | 0.90 | 0.90 |
|  | Gel content (mass %) | | | 97 | 89 | 89 | 87 | 87 |
| Evaluation results | Polychloroprene latex | Low-temperature stability | 5° C. | ◯ | ◯ | ◯ | ◯ | ◯ |
|  |  |  | 0° C. | ◯ | ◯ | ◯ | Δ | ◯ |
|  |  | Coagulation tendency (%) | | 87 | 92 | 92 | 80 | 59 |
|  | Rubber-asphalt composition | Film-forming property | | ◯ | ◯ | ◯ | ◯ | Δ |

TABLE 3

|  |  |  |  | Comparative Example | | | |
|---|---|---|---|---|---|---|---|
|  |  |  |  | 1 | 2 | 3 | 4 |
| Polychloroprene latex | Composition (parts by mass) | Initial addition | Chloroprene | 100 | 100 | 100 | 100 |
|  |  |  | n-Dodecylmercaptan | 0.14 | 0.14 | 0.14 | 0.14 |
|  |  | Divided addition | Chloroprene | — | — | — | — |
|  |  |  | n-Dodecylmercaptan | — | — | — | — |
|  |  | Emulsifying agent | H$_2$O | 100 | 100 | 100 | 100 |
|  |  |  | RONDIS 3RN | 0.50 | — | 1.20 | 0.50 |
|  |  |  | RONDIS K-25 | 1.50 | 4.00 | 2.80 | 3.50 |
|  |  |  | KOH | 0.50 | 1.00 | 0.80 | 0.75 |
|  |  | Dispersing agent | DEMOL N | 0.30 | 0.80 | 0.80 | 0.80 |
|  |  | Reducing agent | Sodium hydrogen sulfite | — | — | — | 0.50 |
|  |  |  | Potassium pyrosulfite | 0.25 | 0.60 | 0.50 | — |
|  |  | Stabilizing agent | Emulgen 220 | — | — | — | 0.50 |
|  | Alkali-metal salt content (in solid matter, mass %) | | Na | 0.09 | 0.08 | 0.22 | 0.23 |
|  |  | | K | 0.68 | 1.52 | 1.13 | 1.03 |
|  | Gel content (mass %) | | | 88 | 91 | 87 | 86 |

TABLE 3-continued

|  |  |  |  | Comparative Example | | | |
|---|---|---|---|---|---|---|---|
|  |  |  |  | 1 | 2 | 3 | 4 |
| Evaluation results | Polychloroprene latex | Low-temperature stability | 5° C. | Δ | Δ | X | ○ |
|  |  |  | 0° C. | X | X | X | ○ |
|  |  | Coagulation tendency (%) | | 85 | 82 | 84 | 11 |
|  | Rubber-asphalt composition | Film-forming property | | ○ | ○ | ○ | X |

As shown in Table 3, the polychloroprene latexes of Comparative Examples 1 and 2, which have a potassium ion content outside the range of the present invention, and the polychloroprene latex of Comparative Example 3, which has a sodium ion content outside the range of the present invention, were found to coagulate easily and to be lower in low-temperature stability. On the other hand, the polychloroprene latex of Comparative Example 4, which has a sodium ion content outside the range of the present invention, showed favorable low-temperature stability, as it contained a stabilizer, but showed inferior film-forming property.

In contrast as shown in Tables 1 and 2, the chloroprene latexes of Examples 1 to 10, which have sodium ion and potassium ion contents in the ranges of the present invention, were superior both in low-temperature stability and coagulation tendency. In addition, the rubber-asphalt compositions prepared by using the chloroprene latexes of Examples 1 to 10 were superior in film-forming property.

The results above confirm that it is possible according to the present invention to obtain a rubber-asphalt composition superior both in low-temperature stability and film-forming property on the material to be coated.

The invention claimed is:

1. An anionic polychloroprene latex for low-temperature stabilizing and film-forming of a rubber-asphalt composition, comprising potassium ions in an amount of 0.70 to 1.50 parts by mass and sodium ions in an amount of 0.10 parts by mass or less with respect to 100 parts by mass of the solid matter; and a gel content of 62 to 95 mass %.

2. The polychloroprene latex according to claim 1, wherein the gel content is 85 to 95 mass %.

3. The polychloroprene latex according to claim 1, wherein the polychloroprene latex is prepared by starting the emulsion polymerization, comprising an initial amount of a monomer which is adjusted to be 10 to 50 mass % of all monomer added, and adding continuously the remaining amount of monomer previously cooled to a temperature lower than the polymerization temperature to the polymerization system during the period of from the time when the polymerization proceeds to a monomer conversion rate of 1 to 40% until the time when the polymerization reaches the final conversion rate.

4. A rubber-asphalt composition, comprising:
a major agent containing 10 to 40 mass % of the polychloroprene latex according to claim 1 and 60 to 90 mass % of an anionic asphalt emulsion, with respect to 100 parts by mass of the major agent and polychloroprene latex; and
a coagulating agent of an aqueous solution containing a polyvalent metal salt as the principal component.

5. A rubber-asphalt composition-utilizing method of forming a waterproof coating film, comprising spraying a major agent containing 10 to 40 mass % of the polychloroprene latex according to claim 1 and 60 to 90 mass % of an anionic asphalt emulsion, with respect to 100 parts by mass of the major agent and polychloroprene latex;
and a coagulating agent of an aqueous solution containing a polyvalent metal salt as the principal component onto a material to be coated separately through different ejecting ports and allowing coagulation reaction and drying of the sprayed agents on the surface of the material.

6. A sheet obtaining by drying the rubber asphalt composition according to claim 4.

7. A waterproof coating film obtained by bonding the rubber-asphalt composition according to claim 4 to a material to be coated and drying the rubber-asphalt composition.

8. The polychloroprene latex according to claim 1, wherein the gel content is 85 to 95 mass %.

9. An anionic polychloroprene latex, comprising potassium ions in an amount of 0.70 to 1.50 parts by mass and sodium ions in an amount of 0.10 parts by mass or less with respect to 100 parts by mass of the solid matter; and a gel content of 85 to 95 mass %.

10. The polychloroprene latex according to claim 1, wherein the sodium ions are in an amount of 0.09 parts by mass or less with respect to 100 parts by mass of the solid matter.

11. The polychloroprene latex according to claim 9, wherein the sodium ions are in an amount of 0.09 parts by mass or less with respect to 100 parts by mass of the solid matter.

12. The polychloroprene latex according to claim 1, wherein the potassium ions are in an amount of 1.03 to 1.50 parts by mass and with respect to 100 parts by mass of the solid matter.

13. The polychloroprene latex according to claim 9, wherein the potassium ions are in an amount of 1.03 to 1.50 parts by mass and with respect to 100 parts by mass of the solid matter.

14. An anionic polychloroprene latex for low-temperature stabilizing and film-forming of a rubber-asphalt composition, comprising potassium ions in an amount of 0.70 to 1.50 parts by mass and sodium ions in an amount of 0.09 parts by mass or less with respect to 100 parts by mass of the solid matter; and a gel content of 62 to 95 mass %.

15. An anionic polychloroprene latex, comprising potassium ions in an amount of 0.70 to 1.50 parts by mass and sodium ions in an amount of 0.09 parts by mass or less with respect to 100 parts by mass of the solid matter; and a gel content of 85 to 95 mass %.

16. The polychloroprene latex according to claim 14, wherein the potassium ions are in an amount of 1.03 to 1.50 parts by mass and with respect to 100 parts by mass of the solid matter.

17. The polychloroprene latex according to claim 15, wherein the potassium ions are in an amount of 1.03 to 1.50 parts by mass and with respect to 100 parts by mass of the solid matter.

* * * * *